US009672207B2

(12) United States Patent
Shmueli

(10) Patent No.: US 9,672,207 B2
(45) Date of Patent: Jun. 6, 2017

(54) SYSTEM, METHOD, AND RECORDING MEDIUM FOR DETERMINING AND DISCERNING ITEMS WITH MULTIPLE MEANINGS

(71) Applicant: International Business Machines Corporation, Armonk, NY (US)

(72) Inventor: Oded Shmueli, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/886,170

(22) Filed: Oct. 19, 2015

(65) Prior Publication Data

US 2017/0109344 A1    Apr. 20, 2017

(51) Int. Cl.
- *G06F 17/27*  (2006.01)
- *G06F 17/30*  (2006.01)
- *G06F 17/24*  (2006.01)
- *G10L 15/18*  (2013.01)

(52) U.S. Cl.
CPC .......... *G06F 17/2785* (2013.01); *G06F 17/24* (2013.01); *G06F 17/3071* (2013.01); *G10L 15/1815* (2013.01); *G10L 15/1822* (2013.01)

(58) Field of Classification Search
None
See application file for complete search history.

(56) References Cited

U.S. PATENT DOCUMENTS

| | | | |
|---|---|---|---|
| 7,251,637 | B1 | 7/2007 | Caid et al. |
| 7,657,495 | B2 | 2/2010 | Hunter et al. |
| 8,301,435 | B2 | 10/2012 | Sadamasa et al. |
| 8,977,537 | B2 | 3/2015 | Burges et al. |
| 2008/0091411 | A1 | 4/2008 | Williams |
| 2013/0006636 | A1 | 1/2013 | Mizuguchi et al. |
| 2014/0278379 | A1* | 9/2014 | Coccaro .............. G10L 15/1815 704/202 |
| 2015/0006155 | A1* | 1/2015 | Tanigaki ............... G06F 17/277 704/9 |

(Continued)

OTHER PUBLICATIONS

Reisinger et al ("Multi-Prototype Vector-Space Models for Word Meaning", ACL Annual Conference of the North American Chapter, Jun. 2010, pp. 109-117.*

(Continued)

*Primary Examiner* — Pierre-Louis Desir
*Assistant Examiner* — Yi-Sheng Wang
(74) *Attorney, Agent, or Firm* — Alexa L. Ashworth, Esq.; McGinn IP Law Group, PLLC

(57) ABSTRACT

A method, system, and non-transitory compute readable medium determining and discerning items with multiple meanings in a sequence of items including producing a distributed representation for each item of the sequence of items including a word vector and a context vector, partitioning the sequence of items into classes, for an item using a representative word vector of each class, calculating a cosine distance between the word vector of said item and the class representative vector, and producing a new sequence of items by modifying the distributed representation in the producing by replacing each occurrence of an item depending on the cosine distance calculated by the calculating.

18 Claims, 7 Drawing Sheets

(56) References Cited

U.S. PATENT DOCUMENTS

2016/0034512 A1* 2/2016 Singhal ............ G06F 17/30719
707/737
2016/0098386 A1* 4/2016 Rangarajan
Sridhar ................ G06F 17/273
704/9

OTHER PUBLICATIONS

Miklov et al ("Efficient Estimation of Word Representations in Vector Space", ICLR Workshop, 2013.*
Liou, et al ("Autoencoder for Words", Neurocomputing Journal 2013.*
Liou et al.; Ttl: Autoencoder for words; Publication Ttl: Neurocomputing, vol. 139, pp. 84-96; 2014; Publisher: Elsevier Science B.V.; Country of Publication: Netherlands; ISSN: 0925-2312; Database: INSPEC.

* cited by examiner

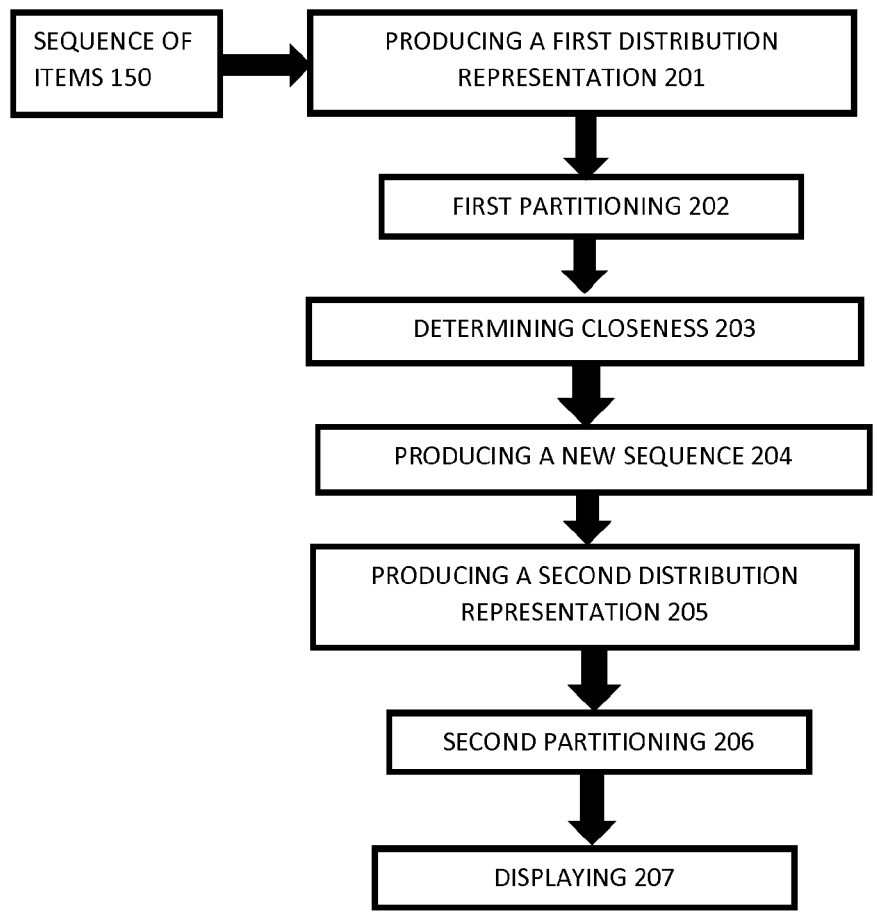

FIG. 3

Before substitution:
CONCEPT_Boston_Pops_Orchestra recorded the work for RC
A Victor, including one of the first stereo recordings of the music. In 1945, CONCEPT_Arturo_Toscanini and the CONCEPT_NBC_Symphony_Orchestra recorded the music in CONCEPT_Carnegie_Hall, one of the few commercial recordings Toscanini made of music by an American After Substitution:
CONCEPT_Boston_Pops_Orchestra_1 recorded_2 the_1 work_2 for_2 R
CA_1 Victor,_2 including_2 one_2 of_1 the_2 first_2 stereo_2 recordings_1 of_2 the_1 music._2
In_1 1945,_1 CONCEPT_Arturo_Toscanini_2 and_2 the_1 CONCEPT_NBC_Symphony_Orchestra_1 recorded_1 the_2 music_1 in_2 CONCEPT_Carnegie_Hall_1 ,_2 one_2 of_1 the_1 few_1 commercial_2 recording s_2 Toscanini_2 made_2 of_1 music_1 by_2 an_2 American_1

FIG. 4

Output Portion:
cases_1(1470) cl=944: problems(1289) factors(529)
problems(1339) conditions(856) factors(533)
conditions(949) systems(2668) cases(1470)
systems(2594)

cases_2(1373) cl=802: criminal(457) criminal(443)
law(3783) law(3652) legal(1217) cases(1373)
defendant(139) prosecution(130)

SYSTEM, METHOD, AND RECORDING MEDIUM FOR DETERMINING AND DISCERNING ITEMS WITH MULTIPLE MEANINGS

BACKGROUND

The present invention relates generally to determining and discerning items with multiple meanings, and more particularly, but not by way of limitation, to an unsupervised and non-dictionary based system, method, and recording medium for determining "senses" in which a word appears and associating the words with particular occurrences in the input sequence.

Conventional techniques of determining and discerning items with multiple meanings of words have proven useful in applications such as discerning multiple meanings. Generally, success depends on using external resources such as dictionaries, thesauri and user input. To date, distributed representations have not been used in discerning meanings although they proved useful in other domains such as analogy determination. However, despite many usages suggested for word vectors, their internal structure remains opaque. That is, the conventional distributed determining and discerning items with multiple meanings do not make possible to discern between words/items with multiple meanings with any reliability simply because it is unknown how to decode vector entries in distributed representations.

Conventional techniques of determining and discerning items with multiple meanings systems cannot discern items with multiple meanings with high reliability without external resources. For example, the word 'party' may appear in a sequence. By examining the distributed representation of words in the sequence, conventional systems cannot discern between the multiple meanings of the word "party" which could mean a celebration, a group of people, a political association, etc.

Discerning the different meanings of words in a corpus has been the subject of much research. Conventional methods have proposed an unsupervised method based on word vectors to discriminate between senses of a word, without labeling (or explaining) these senses. The method involves no learning although it suggests using SVD decomposition to reduce vectors' dimensionality. Each word w is associated with a word vector (different than the ones used in this patent) whose dimensions are words occurring in a window around the word w. The vector entry in a dimension is the number of occurrences of the word of this dimension in the windows around occurrences of w in the learning text. Given a particular word w to be disambiguated, one forms context vectors for w over the training text. A context vector is simply the normalized average vector of the word vectors of words in a window around an occurrence of w. The collection of context vectors for w is partitioned into clusters and the average vector of each cluster represents the cluster. Given a w occurrence in some test text, a context vector c for this occurrence of w is constructed. The cluster whose representative vector is cosine-closest to c defines the sense of this "new" w occurrence in the test text.

Thus, there is a technical problem in the conventional determining and discerning items, using distributed representation, with multiple meanings systems as they have no capability to discern between words having multiple meanings with an explanation of said meanings. More specifically, the conventional methods have the technical problem that the conventional methods do not have two trainings, one over the original text and one over the modified text in which each word is replaced by its "sense" so as to explain the 'senses' using the text itself. Further, the conventional methods do not use a class average context vectors as trained in this application as such vectors are not present in the conventional techniques. Accordingly, the conventional systems cannot help a user to comprehend the sequence even without a dictionary.

SUMMARY

In an exemplary embodiment, the present invention can provide a method of determining and discerning items with multiple meanings in a sequence of items, the method including producing a distributed representation for each item of the sequence of items including a word vector and a context vector, partitioning the sequence of items into classes, for an item using a representative word vector of each class, calculating a cosine distance between the word vector of said item and the class representative vector, and producing a new sequence of items by modifying the distributed representation in the producing by replacing each occurrence of an item depending on the cosine distance calculated by the calculating.

Further, in another exemplary embodiment, the present invention can provide a non-transitory computer-readable recording medium recording a program for determining and discerning items with multiple meanings in a sequence of items, the program causing a computer to perform: producing a distributed representation for each item of the sequence of items including a word vector and a context vector, partitioning the sequence of items into classes, using a representative word vector of each class, calculating a cosine distance between the word vector and the class representative word vector, and producing a new sequence of items by modifying the distributed representation in the producing by replacing each occurrence of an item depending on the cosine distance calculated by the calculating.

Even further, in another exemplary embodiment, the present invention can provide a system for determining and discerning items with multiple meanings in a sequence of items, the system including a first distribution producing device configured to produce a distributed representation for each item of the sequence of items including a word vector and a context vector, a first partitioning device configured to partition the sequence of items into classes, a closeness determining device configured to calculate, using a representative word vector of each class, a cosine distance between the word vector and the class representative word vector, and a new sequence producing device configured to produce a new sequence of items by replacing each occurrence of an item depending on the cosine distance calculated by the closeness determining device.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 2 exemplarily shows a high level flow chart for determining and discerning items with multiple meanings.

FIG. 3 exemplary shows a sequence before and after producing a second distribution representation 205.

FIG. 4 exemplary shows a final output by a display device 107.

DETAILED DESCRIPTION

Figure 1:
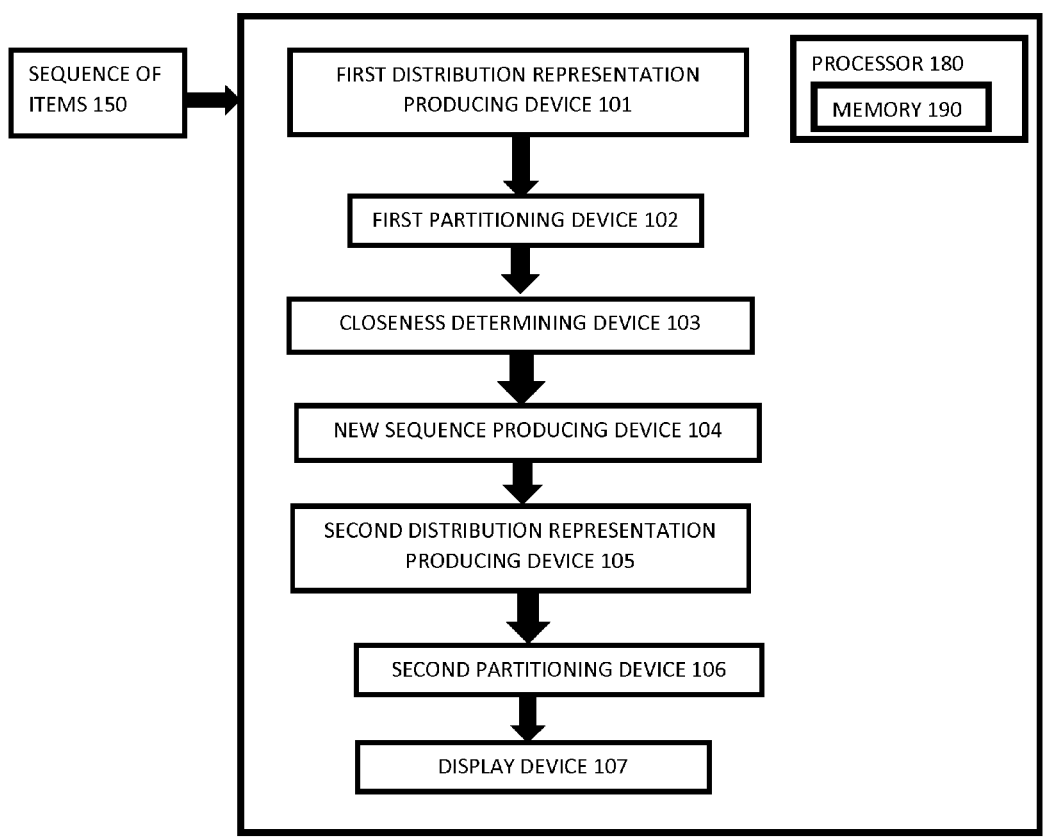
FIG. 1 exemplarily shows a block diagram illustrating a configuration of a system 100 determining and discerning items with multiple meanings.

The invention will now be described with reference to FIGS. 1-7, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

It should be noted that from here on the term "word" or "item" stands for either a word, a concept (e.g., a Wikipedia entry, and in general a sequence of words that is identified as a concept by a community, e.g. "French revolution"), an item that appears in a sequence (e.g., a sequence of graph nodes, a sequence of chemical formulae), etc.

With reference now to FIG. 1, the determining and discerning items with multiple meanings system 100 includes a first distribution representation producing device 101, a first partitioning device 102, a closeness determining device 103, a new sequence producing device 104, a second distribution representation producing device 105, a second partitioning device 106, and a display device 107. The determining and discerning items with multiple meanings system 100 receives a sequence of items 150 as an input.

It should be noted that "items" is intended to mean "words" but is not limited thereto as any sequence of items can be input into the determining and discerning items with multiple meanings system 100. Thus, for example, the determining and discerning items with multiple meanings system 100 includes a processor 180 and a memory 190, with the memory 190 storing instructions to cause the processor 180 to execute each device of the determining and discerning items with multiple meanings system 100.

Figure 5:
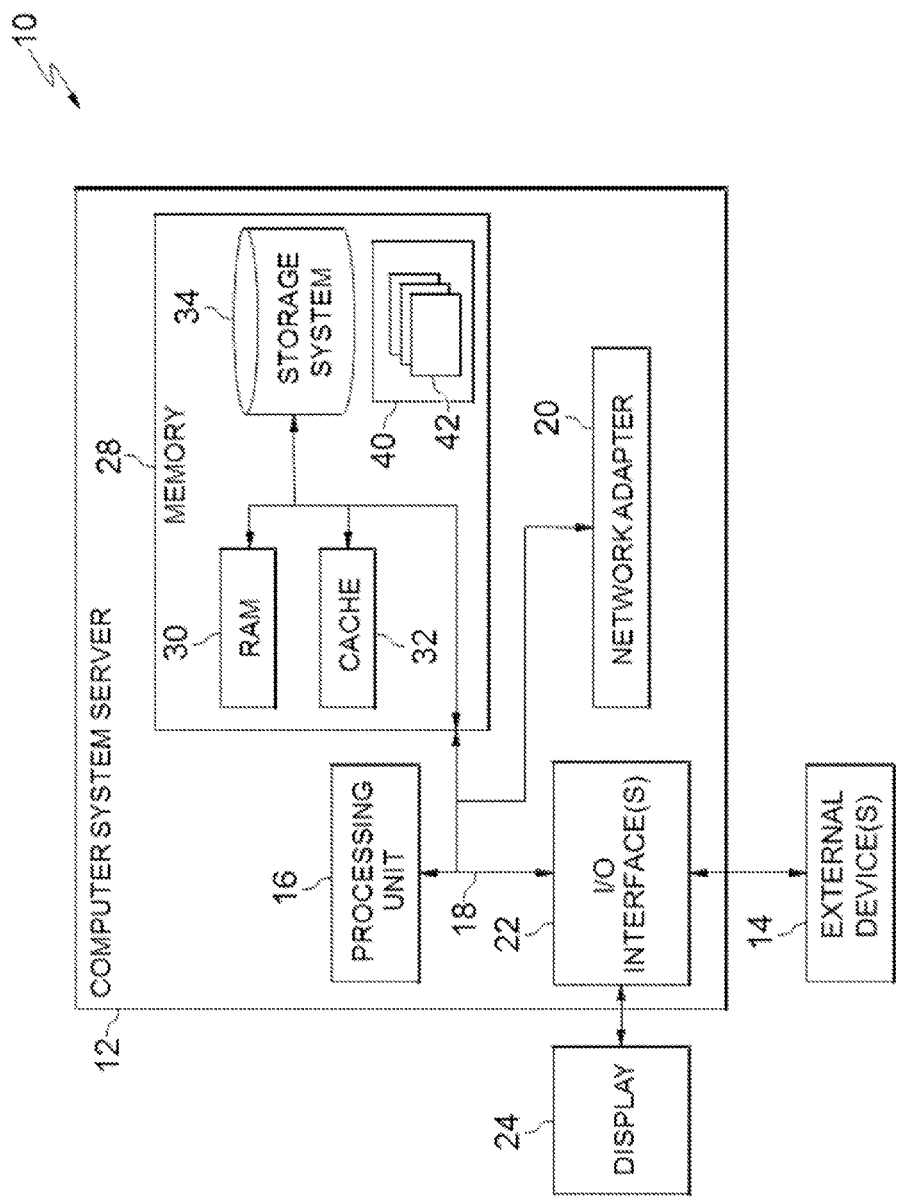
FIG. 5 depicts a cloud computing node according to an embodiment of the present invention.
Figure 6:
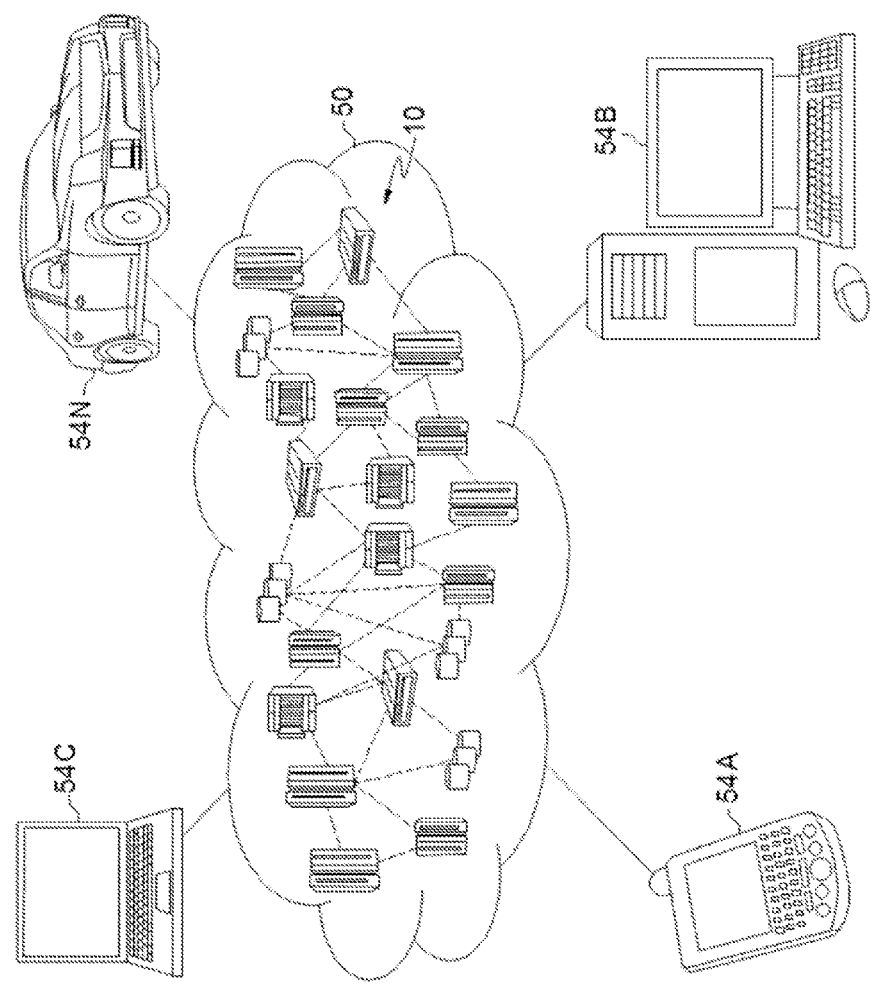
FIG. 6 depicts a cloud computing environment according to another embodiment of the present invention.
Figure 7:
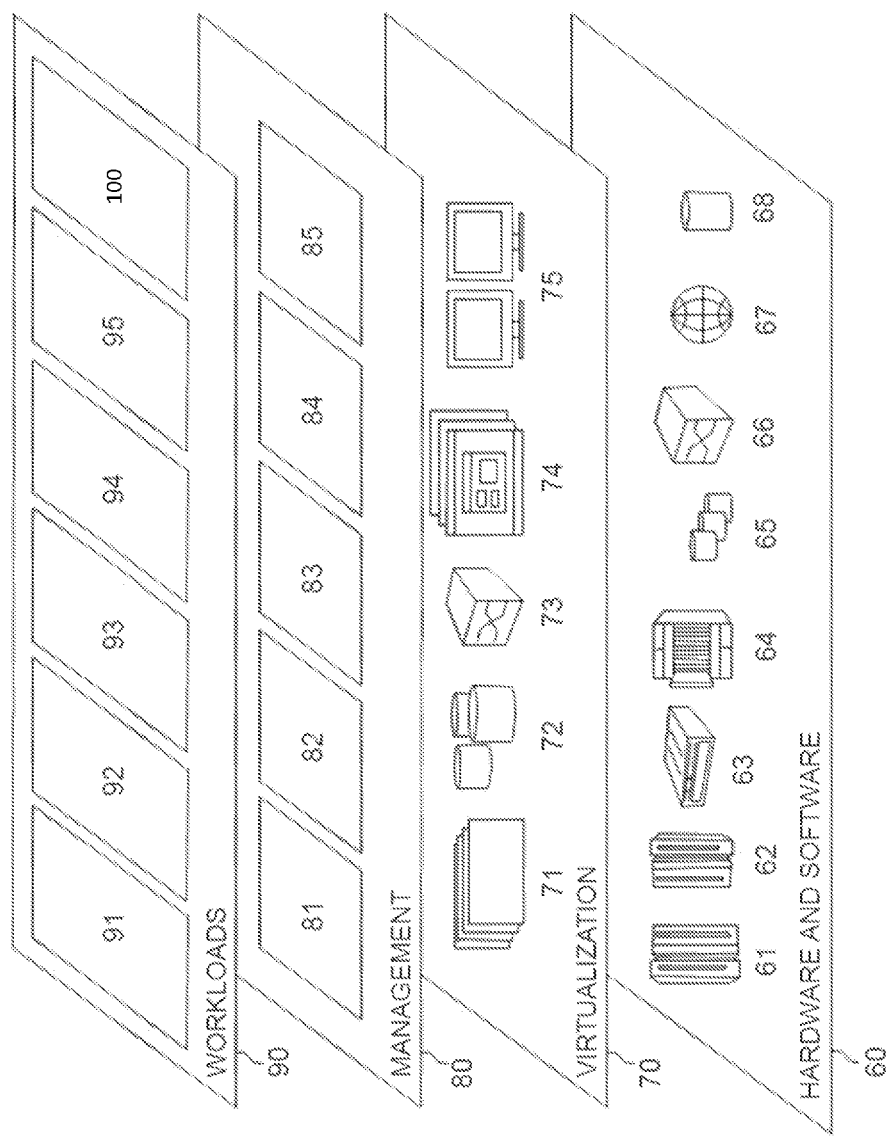
FIG. 7 depicts abstraction model layers according to an embodiment of the present invention.

Although as shown in FIGS. 5-7 and as described later, the computer system/server 12 is exemplarily shown in cloud computing node 10 as a general-purpose computing device which may execute in a layer the determining and discerning items with multiple meanings systems 100 (FIG. 7), it is noted that the present invention can be implemented outside of the cloud environment.

The first distribution representation device 101 receives the sequence of items 150 and produces a distributed representation for each item "w" as a word vector and a context vector. That is, the distribution representation device 101 uses a vector producing algorithm such as word2vec (w2v) or Glove, and produces output vectors of two types per each item: word (Syn0 type in w2v) and context (Syn1neg in w2v)). More specifically, given a sequence of items (words, concepts, nodes in a graph, etc. or a combination thereof), the first distribution representation device 101 learns a distributed representation (i.e. vectors) of dimension n (a user specified parameter), using a tool such as word2vec or Glove.

The first partitioning device 102 partitions the items into preferably a plurality of classes. For each class "C" the first partitioning device 102 keeps a word representative vector "c" and a context representative vector "c". The numbering of the classes that the partitioning device 102 partitions the items into is C1 to Cm, where m is the number of classes. Generally, the first partitioning device 102 may partition the items into, for example, 200 classes but the first partitioning device 102 can partition the items into any number of classes that a user specifies.

More specifically, the first partitioning device 102 partitions the items into a number "m" of classes using the word vectors by using K-means clustering or any other appropriate vector clustering methods can be used. Each class is a set of items and classes are numbered arbitrarily as C1 to Cm. The union of the classes is the whole collection of items or a subset of interest thereof. If an item "w" belongs to class Ci, the primary dimension of item "w" is "i".

That is, the first partitioning device 102 forms "m" classes C1 to Cm, each class being a set of items. The union of the classes is the whole vocabulary or a portion thereof of interest. Class forming is done by the first partitioning device 102 based on the distributed representation, for example, by applying a clustering algorithm to the word vectors.

The first partitioning device 102 keeps the word (Syn0 in w2v) vectors and context (Syn1neg in w2v) vectors. With each class C, the first partitioning device 102 keeps two representative vectors: "c", derived from the class word vectors, and "c", derived from the class context vectors. The representative vectors can be produced for a class by adding all the vectors in the class and producing a sum vector and normalizing the sum vector by dividing the sum vector by its length.

Another exemplary way to produce a representative vector is to weigh the added vectors by multiplying the word vector of item w by the number of occurrences of item w of the added vector of item w, or alternatively by multiplying by the "log" of the number of occurrences of item w. It should be noted that there are additional methods for constructing the class representative vector besides the ones mentioned above. For example, all vectors need not be used, but instead only those vectors can be used with a number of occurrences between some constants a and b or between ranking a and b where ranking is in terms of the number of occurrences of the item in the input sequence. In all these methods, a user can choose an actual class member whose word vector is the closest to the calculated representative vector (e.g., by using cosine distance).

For each word w, the closeness determining device 103 determines the k classes that are closest to it. The "closeness" is calculated based on a cosine distance to the c representative vectors of classes.

More specifically, using the representative word vector c (constructed out of the word vectors (Syn0 vectors in word2vec)) of each class C, the closeness determining device 103 calculates the cosine distance between the word vector of w and the class C representative, c, vector. In this manner, the closeness determining device 103 determines the desired few classes, not including w's own class, that are "close" to item w. The closeness determining device 103 calculates the cosine distance for each vocabulary item, each item w being associated with the few classes to whose representative word vector the cosine distance is highest, and for ease of description the closeness determining device 103 assumes that there are always three such strongly relating classes which are numbered with indexes "1", "2" and "3". It should be noted that there can be more than 3 classes. The few classes are viewed as 'senses' of w as w is close to these classes but not one of their members.

The new sequence producing device 104 produces a new sequence by replacing each word w occurrence oc in the input sequence by w_i where i is the class among the k closest classes whose c' vector representative is cosine closest to the average context vector for the words in a window around oc as shown in FIG. 3.

More specifically, the new sequence producing device 104 modifies the original input sequence by replacing each occurrence of an item w with a w where s is 1, 2 or 3 depending on the cosine distance calculated by the closeness determining device 103 between the particular strongly relating class (i.e., 'sense') context vector (Syn1neg type in w2v) representative (constructed similarly to its word (Syn0 type in w2v) representative) and a vector representing the context surrounding w in the sequence.

The context surrounding w in the sequence is represented simply by the average vector av of word (Syn0 in w2v) vectors of the items (e.g., 8 on each side) surrounding the occurrence of w in the input sequence. This determines to which context (Syn1neg in w2v) vector av, the vector representing the collection of surrounding items, is cosine closest.

Intuitively, this is the 'sense' in which the item w is used in this surrounding context.

Note that the new sequence producing device 104 excludes the item itself from the context and just considers its surrounding sequence items. This substitution has a side effect of expanding the vocabulary (it is not necessarily three times the size of the original vocabulary as not all item w senses w1, w2 and w3 are usually significant in practice). It should be noted that, in calculating vector av, different surrounding context items may be weighted differently, e.g., the closest may be weighted more.

The second distribution representation producing device 105 produces a distributed representation for the new sequence output by the new sequence producing device 104 for each word w with the "new" context vector and the word vector.

The second partitioning device 106 partitions the new items into classes. That is, the second partitioning device 106 forms classes, using a clustering algorithm, based on the resulting word (Syn0 in w2v) vectors.

As shown in FIG. 4, the display device 107 displays dominant members of each formed class. For each original w, display its w_i variations dominant members next to each other.

That is, the display device 107 displays for each original word w's "family" member w1, w2 and w3 the dominant representatives of its newly computed class for that member, in order to expose the different meanings, or senses, the member has in terms of the expanded vocabulary.

FIG. 2 shows a high level flow chart for a method 200 for determining and discerning items with multiple meanings.

Step 201 receives a sequence of items 150 and produces a distributed representation for each item "w" as a word vector and a context vector. Step 201 runs word2vec or similar vector producing tool and, obtains word vectors v1, . . . , vn for words w1, . . . , wn in the vocabulary V of text T=t1, t2, . . . , tu.

Step 202 partitions the items into classes. For each class "C", step 202 keeps a word representative vector "c" and a context representative vector "c". Step 202 partitions the items in V into N classes, C1, . . . , CN, N about 10,000 based on the vectors obtained, e.g. by using K-means or a similar procedure. For each class Ci, let its ci vector be the class center vector of Ci derived from clustering the word (Syn0) vectors. Let ci' be the class Ci center (average) derived from the context (Syn1neg) vectors of the items of class Ci. For each word wj in V, let Ci1, . . . , Cik be the "strong" classes whose cim, 1≤m≤k vectors are closest to vj, preferably k should be such that k<8 and all ci2, . . . , cik are at least ⅔ as close to w as ci1 (i.e., the closest), is.

For each word w, step 203 determines the k classes that are closest to it by calculating a cosine distance to the c vectors of classes. More specifically, step 203 scans the text T=t1, t2, . . . , tV, let the current center word be tm which, say, is a vocabulary word wi. Step 203 considers the average of the word (Syn0) vectors of words in a window of size L, (e.g., 16 (8 on both sides)) surrounding word tm and then step 203 calculates the value of the cosine distance of vector average and each of c'i1, . . . , c'ik, let c'ij be the one for which the value is highest. Index j is used in producing a replacement word for tm as follows.

Step 204 produces a new sequence by replacing each word w occurrence oc in the input sequence by w_j where 1≤j≤k is the index of the class, among the k closest classes whose c' vector is cosine closest to the average context vector for the words in a window around oc as shown in FIG. 3. More specifically, step 204 replaces in the text word occurrence tm with a "variation" wi_j. For example, if word occurrence tm=car and "car" has 3 "strong" classes and the current context (of tm) average vector is closest to the vector c'i2 representing the second strong class, then tm=car is replaced by car_2. So, each occurrence is replaced with the appropriate "sense" of the word in the current window context usage.

Step 205 produces a distributed representation for the new sequence output by step 204 for each word w with the context vector and the word vector. That is, step 205 runs word2vec or a similar tool on the modified input sequence resulting from the scan above.

Step 206 partitions the new items into classes. That is, step 206 forms classes, using a clustering algorithm, based on the resulting word (Syn0 in w2v) vectors. Step 206 obtain vectors and partitions them into classes via clustering.

As shown more specifically in FIG. 4, step 207 displays dominant members of each class. For each original w, the display step 207 displays its w_i variations dominant members next to each other. More specifically, step 207 presents for each vocabulary word wi, for each "variation" wi_j, the class to which it belongs by listing the "heaviest", for example, 8 members. Again, "heaviest" can be defined in various ways as discussed above.

In view of the foregoing and other problems, disadvantages, and drawbacks of the aforementioned background art, the disclosed invention above can provide a new and improved determining and discerning items with multiple meanings system which can determine and discern items with multiple meanings. More particularly, it is desirable to provide an unsupervised and non-dictionary based system, method, and recording medium for determining "senses" in which a word appears and associating the senses with particular occurrences of the word in the input sequence.

An exemplary aspect of the disclosed invention provides a system, method, and non-transitory recording medium for determining and discerning items with multiple meanings which can provide a technical solution to the technical problem in the conventional approaches by examining the distributed representation of words in the sequence, deciding on main types of occurrences, and then, replacing each occurrence of the word in the input sequence with the "appropriate sense" word and occurrence sequence by listing "strongly related" words for each of the occurrences. That is, an exemplary aspect of the disclosed invention can provide a technical solution that two trainings, one over the original text and one over the modified text in which each word is replaced by its "sense" so as to explain the 'senses' using the text itself to discern between words having multiple meanings In this manner, the disclosed invention can provide a technical solution to the technical problem in the conventional approaches and each word can be given a definition in the sequence to determine and discern the items with multiple meanings. Further, the new and improved determining and discerning items with multiple meanings system is based on vectors such that no auxiliary structures such as dictionaries are needed and the senses are not defined in advance and are actually discovered and characterized by listing the words having them.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the determining and discerning items with multiple meanings system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method of determining and discerning items with multiple meanings in a sequence of items, the method comprising:
    producing a distributed representation for each item of the sequence of items including a word vector and a context vector;
    partitioning the sequence of items into classes;
    for an item using a representative word vector of each class, calculating a cosine distance between the word vector of said item and the class representative vector; and
    producing a new sequence of items by modifying the distributed representation in the producing by replacing each occurrence of an item in the distributed representation having a largest cosine distance between the word vector and the class representative vector calculated by the calculating; and
    wherein the producing the new sequence produces the new sequence by replacing each word occurrence in the input sequence of items by w_i, where i comprises the class index among closest classes that the cosine distance of the representative context vector of the class is closest to an average word vector for the items in a window around the item.

2. The method of claim 1, further comprising producing a new distributed representation for the new sequence of items produced in the producing the new sequence of items.

3. The method of claim 2, further comprising partitioning the set of items in the new sequence of items into classes.

4. The method of claim 2, further comprising displaying a dominant member of each class based on the member having the largest cosine distance between the word vector of a potential dominant member item and the class representative vector.

5. The method of claim 1, wherein the calculating scans the sequence of items and sets a current center item as a vocabulary word and uses an average of the word vectors of items in a window of a predetermined size surrounding the vocabulary word, and then calculates the cosine distance of the vector average with a class representative context vector.

6. The method of claim 1, wherein the producing the new sequence replaces the item with a variation of the item based on a sense of the item in a current context usage.

7. The method of claim 1, wherein the producing the new sequence replaces the item with a variation of the item based on a sense of the item in a current context usage.

8. The method of claim 1, wherein a first phase includes the producing the distributed representation, the partitioning, and the calculating the cosine distance, the method further comprising:
    in a second phase when the producing produces the new sequence: producing a modified sequence of items by replacing each item I occurrence in the sequence by an I_j occurrence where j is one of the D classes for item I;
    producing a new distributed representation for each item I_m of the modified sequence of items including a word vector and a context vector; and
    using said new distributed representation for determining and discerning items with multiple meanings.

9. The method of claim 1, further comprising producing for each item by calculating a fixed number of classes D with smallest said cosine distance.

10. A non-transitory computer-readable recording medium recording a program for determining and discerning items with multiple meanings in a sequence of items, the program causing a computer to perform:

producing a distributed representation for each item of the sequence of items including a word vector and a context vector;

partitioning the sequence of items into classes;

using a representative word vector of each class, calculating a cosine distance between the word vector and the class representative word vector; and producing a new sequence of items by modifying the distributed representation in the producing by replacing each occurrence of an item in the distributed representation having a largest cosine distance between the word vector and the class representative vector calculated by the calculating; and wherein the producing the new sequence produces the new sequence by replacing each word occurrence in the input sequence of items by w_i, where i comprises the class index among closest classes that the cosine distance of the representative context vector of the class is closest to an average word vector for the items in a window around the item.

11. The non-transitory computer-readable recording medium of claim 10, further comprising producing a new distributed representation for the new sequence of items produced in the producing the new sequence of items.

12. The non-transitory computer-readable recording medium of claim 11, further comprising partitioning the set of items in the new sequence of items into classes.

13. The non-transitory computer-readable recording medium of claim 11, further comprising displaying a dominant member of each class based on the cosine distance between the word vector of a potential dominant member item and the class representative vector.

14. The non-transitory computer-readable recording medium of claim 11, wherein the calculating scans the sequence of items and sets a current center item as a vocabulary word and uses an average of the word vectors of items in a window of a predetermined size surrounding the vocabulary word and then calculates the cosine distance of the vector average with a class representative context vector.

15. A system for determining and discerning items with multiple meanings in a sequence of items, the system comprising:

a first distribution producing device configured to produce a distributed representation for each item of the sequence of items including a word vector and a context vector;

a first partitioning device configured to partition the sequence of items into classes; a closeness determining device configured to calculate, using a representative word vector of each class, a cosine distance between the word vector and the class representative word vector; and a new sequence producing device configured to produce a new sequence of items by modifying the distributed representation in the producing by replacing each occurrence of an item in the distributed representation having a largest cosine distance between the word vector and the class representative vector calculated by the calculating; and wherein the producing the new sequence produces the new sequence by replacing each word occurrence in the input sequence of items by w_i, where i comprises the class index among closest classes that the cosine distance of the representative context vector of the class is closest to an average word vector for the items in a window around the item.

16. The system of claim 15, further comprising a second distribution representation producing device configured to produce a new distributed representation for the new sequence of items produced in the producing the new sequence of items.

17. The system of claim 15, further comprising a second partitioning device configured to partition the new sequence of items into classes.

18. The system of claim 15, further comprising a display device configured to display a dominant member of each class based on the cosine distance between the word vector and the class representative word vector.

* * * * *